United States Patent [19]

Senger

[11] Patent Number: 5,405,201
[45] Date of Patent: Apr. 11, 1995

[54] ALIGNMENT RING FOR SPLIT BEARING RACE AND METHOD OF ASSEMBLY

[75] Inventor: Christopher G. Senger, Torrington, Conn.

[73] Assignee: The Torrington Company, Torrington, Conn.

[21] Appl. No.: 282,352

[22] Filed: Jul. 29, 1994

[51] Int. Cl.⁶ .............................................. F16C 33/04
[52] U.S. Cl. ..................................... 384/273; 384/294
[58] Field of Search ............... 384/273, 294, 288, 295, 384/272, 457

[56] References Cited

U.S. PATENT DOCUMENTS

| | | |
|---|---|---|
| 1,481,705 | 1/1924 | Gimeno . |
| 1,863,809 | 6/1932 | Hopkins et al. . |
| 2,371,400 | 3/1945 | Mantle . |
| 3,007,754 | 11/1961 | Cross . |
| 3,140,130 | 7/1964 | Barr . |
| 5,009,522 | 4/1991 | Hahn ................................... 384/273 |
| 5,267,797 | 12/1993 | Brandt ................................. 384/294 |

FOREIGN PATENT DOCUMENTS

| | | |
|---|---|---|
| 156243 | 9/1903 | Germany . |
| 698002 | 10/1940 | Germany . |
| 960514 | 3/1957 | Germany . |

*Primary Examiner*—Lenard A. Footland
*Attorney, Agent, or Firm*—John C. Bigler

[57] ABSTRACT

A split outer ring has a raceway on a radially inwardly directed surface and a circumferential groove with tapered side walls on a radially outwardly directed surface and comprises a first arcuate portion and a second arcuate portion. An alignment ring engages the circumferential-groove of the split outer ring, forming an interference fit with the tapered side walls of the circumferential groove such that alignment of the first arcuate portion with respect to the second arcuate portion is maintained. A method of assembling a housed bearing, utilizing opposing jaws engaging a similar circumferential groove in the split outer ring, is also disclosed.

9 Claims, 3 Drawing Sheets

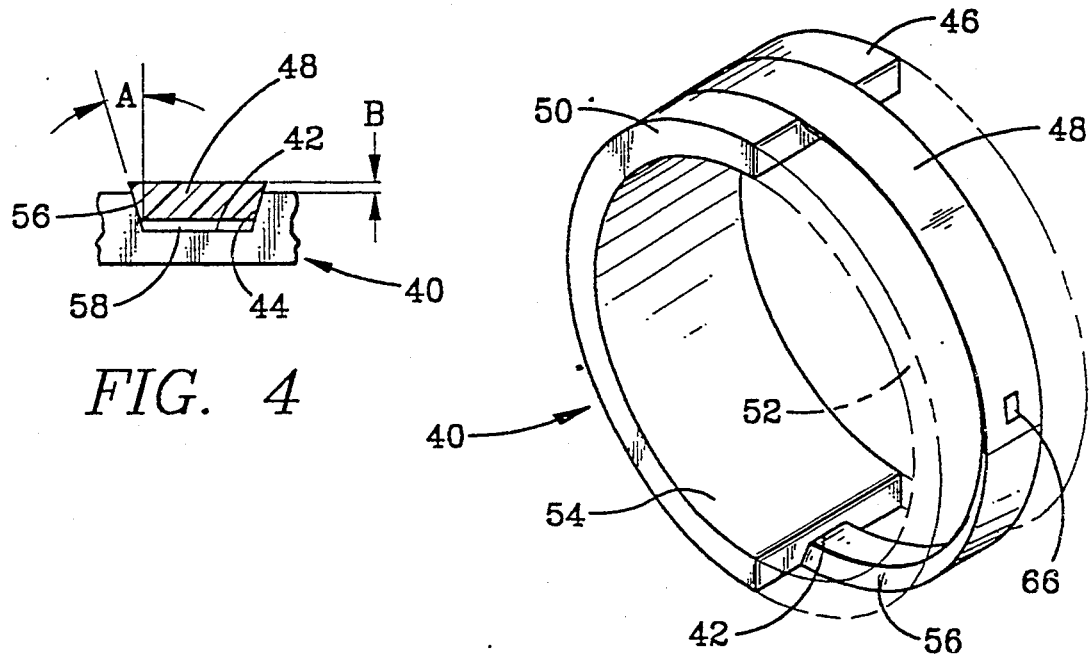
FIG. 4
FIG. 3
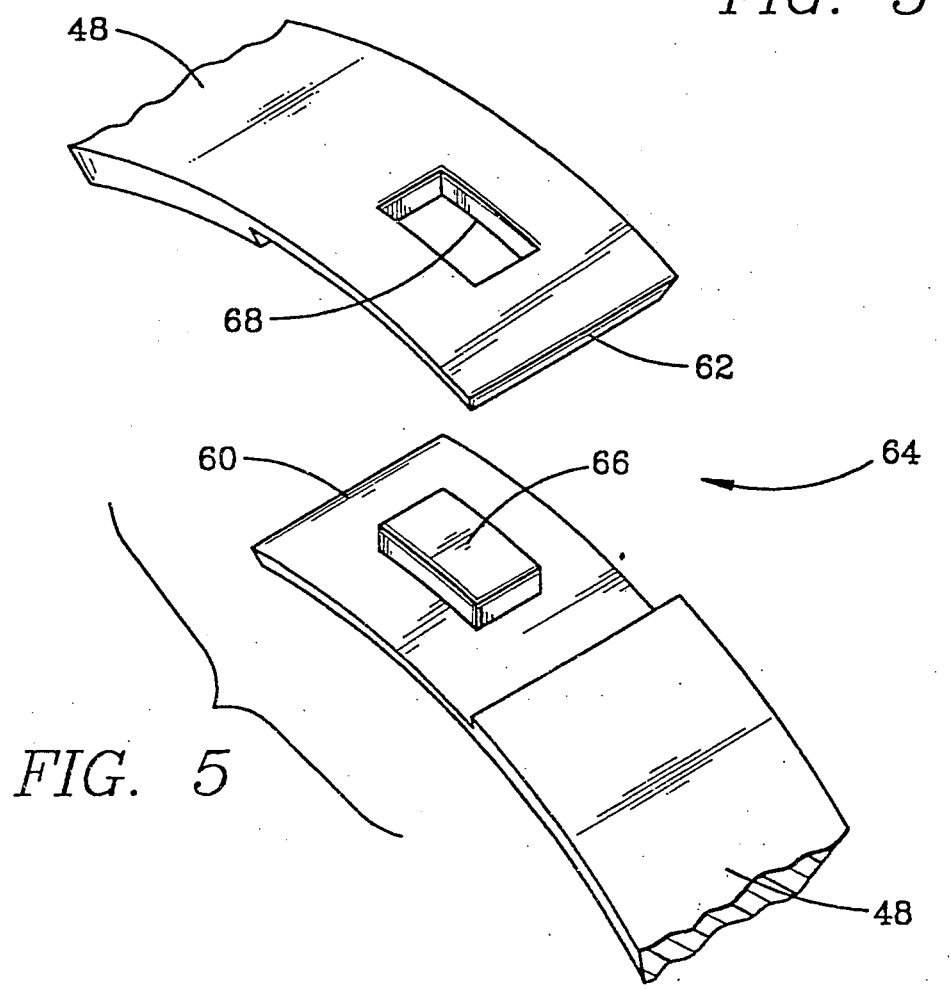
FIG. 5

ALIGNMENT RING FOR SPLIT BEARING RACE AND METHOD OF ASSEMBLY

BACKGROUND OF THE INVENTION

This invention relates generally to rotary bearings with split rings and, more particularly, to a split (or fractured) outer ring for a housed antifriction bearing.

Many applications, such as a crankshaft, for example, require bearings that are installed radially rather than axially, over the end of a shaft. Typically, a split cage and roller assembly, or other complement of rolling elements, is placed on a journal and a split outer ring is installed over them. A snap ring or piano wire may be placed around the outer ring to hold the halves together while the outer ring is fitted into a bearing seat. A cover providing the other half of the bearing seat is then installed over the split outer ring, and the assembly is bolted together.

Fitting the split outer ring in the bearing seat frequently causes the halves of the outer ring to shift out of alignment as one half is compressed radially inward while the other half is free and not compressed. When the cover is installed and bolted to the bearing seat, the split surfaces of the outer ring may tend to bind together, preventing realignment of misaligned halves of the outer ring. This can result in mismatch of the outer ring at the split locations, appearing as a "step" in the outer raceway surface, causing undesirable noise or premature fatigue failure of the outer ring or rolling elements.

The foregoing illustrates limitations known to exist in present split bearing rings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a split outer ring and alignment ring for mounting in a bearing housing. The split outer ring has a raceway on a radially inwardly directed surface and a circumferential groove with tapered side walls on a radially outwardly directed surface and comprises a first arcuate portion and a second arcuate portion. The alignment ring engages the circumferential groove of the split outer ring, forming an interference fit with the tapered side walls of the circumferential groove such that alignment of the first arcuate portion with respect to the second arcuate portion is maintained.

In another aspect of the present invention, this is accomplished by providing a method of assembly of a housed bearing. A split outer ring with a raceway on a radially inwardly directed surface and first and second circumferential grooves on a radially outwardly directed surface comprises a first arcuate portion and a second arcuate portion. Opposing jaws of an alignment fixture are positioned in the first the circumferential groove, in engagement with tapered side walls, to provide positive alignment of the first arcuate portion with respect to the second arcuate portion. An alignment ring is then installed in the second circumferential groove. The opposing jaws of the alignment fixture are released from the first circumferential groove such that the split outer ring is held together by the alignment ring as a rigid subassembly, maintaining the positive alignment of the first and second arcuate portions.

The foregoing and other aspects will become apparent from the following detailed description of the invention when considered in conjunction with the accompanying drawing figures.

BRIEF DESCRIPTION OF THE DRAWING FIGURES

FIG. 3 is a pictorial view of a preferred embodiment of the bearing split outer ring and alignment ring of the present invention;

FIG. 4 is an enlarged cross-sectional view of the preferred embodiment of the bearing split outer ring and alignment ring of FIG. 3;

FIG. 5 is a pictorial view of ends of the alignment ring of FIG. 3 in an open position, prior to being closed and locked together;

In this specification, identical elements in different figures are given identical reference characters.

DETAILED DESCRIPTION

Figure 1:
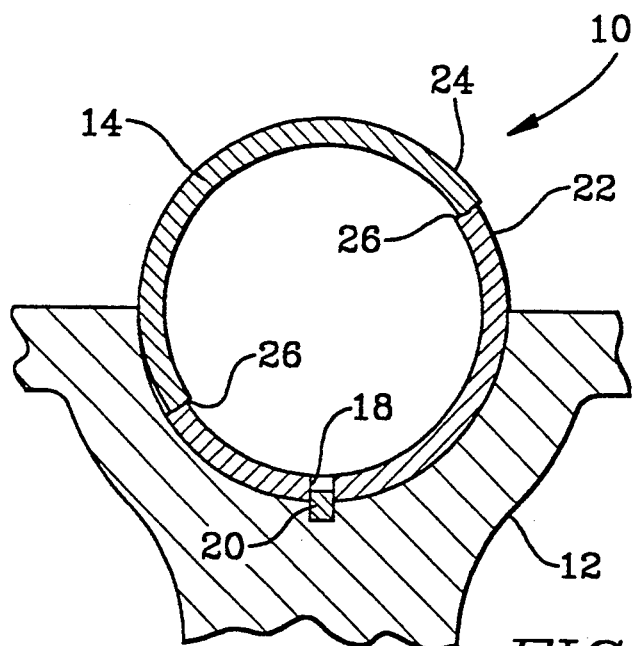
FIG. 1 is a cross-sectional view of a prior art bearing split outer ring, positioned in a corresponding housing base.

Referring to FIG. 1, bearing split outer ring 10, typical of the prior art, is shown positioned in housing base 12 that provides a bearing seat for half of split outer ring 10. Split outer ring 10 is divided substantially in half to form two arcuate portions 14 and 16. Aperture 18 is provided in lower arcuate portion 16 for engagement with dowel pin 20 to locate split outer ring 10 axially and to orient the split.

Housing base 12 provides an interference fit with the perimeter of arcuate portion 16 of split outer ring 10, compressing free end 22 thereof radially inward. Because the split is generally oriented at 10 to 30 degrees from the parting line of the housing base, free end 24 of upper portion 14 of split outer ring 10 is not compressed radially inward. As a result, steps 26 can occur in split outer ring 10 due to mismatch of upper and lower arcuate portions 14 and 16.

Figure 2:
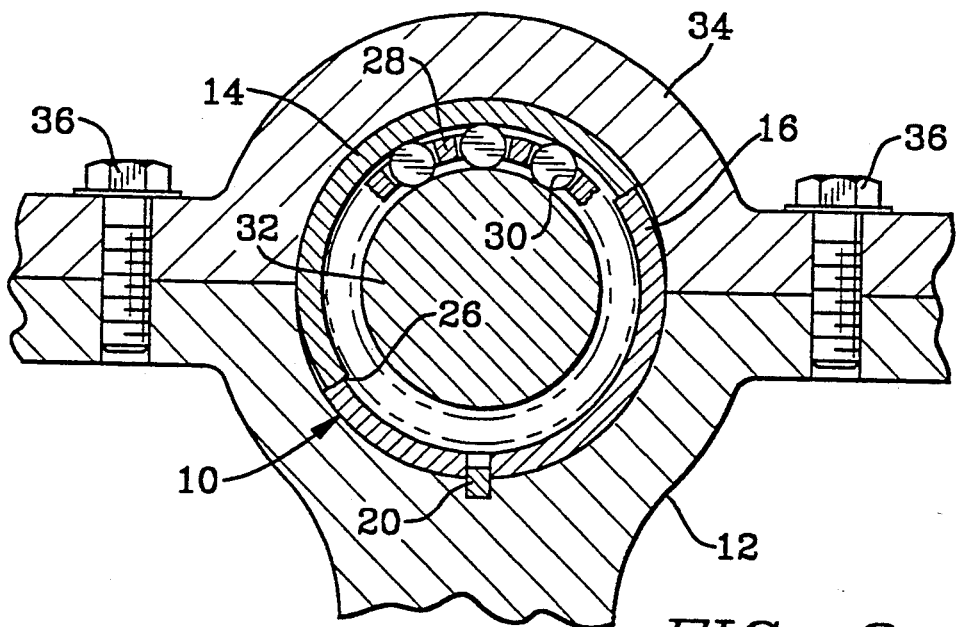
FIG. 2 is a cross-sectional view of a prior art bearing and housing assembly including the bearing split outer ring and housing base of FIG. 1.

FIG. 2 shows split outer ring 10 assembled in a main bearing location of a two-cycle or four-cycle engine. Split cage 28, rolling elements 30, and crankshaft journal 32 are positioned within split outer ring 10, such that split outer ring 10 provides an outer raceway for rolling elements 30, and cover 34 is added. Cover 34 is mounted on housing base 12 by cap screws 36 to provide an upper bearing seat and complete the housing for split outer ring 10.

As illustrated, the steps 26 caused by the mismatch of upper and lower portions 14 and 16 of the split outer ring 10 can remain in the raceway of split outer ring 10 after cover 34 is installed. The interference fit of housing base 12 and cover 34 can cause ends 22 and 24 of split outer ring 10 to bind together, particularly if the split in outer ring 10 is formed by fracturing or is otherwise irregular.

In contrast to the prior art, split outer ring 40 of the present invention has circumferential groove 42 with tapered side walls 44 provided on radially outwardly directed surface 46, as illustrated in FIG. 3. Alignment ring 48 engages circumferential groove 42 and forms an interference fit with tapered side walls 44. Split outer ring 40 comprises first arcuate portion 50 and second arcuate portion 52 and provides an outer raceway for rolling elements along radially inwardly directed surface 54.

Alignment ring 48 is forced into circumferential groove 42 such that alignment of first arcuate portion 50 with respect to second arcuate portion 52 is maintained. Preferably, alignment ring 48 has angled side surfaces 56 that form a wedge shape to mate with tapered side walls 44 of circumferential groove 42. Although other draft angles may be used with similar effect, Applicant has found that draft angle A, indicated in FIG. 4, is particularly effective when between 3 degrees and 10 degrees.

As illustrated in FIG. 4, circumferential groove 42 has a V-shape with a flat bottom and is sufficiently deep with respect to alignment ring 48 to ensure that the desired wedging action is achieved. Note that space 58 separates alignment ring 48 from the flat bottom of circumferential groove 42. Alignment ring 48 extends radially outward of split outer ring 40 a distance B (for example, 0.002 inch) to provide a slight interference fit with a bearing housing to dampen vibration and reduce noise.

Alignment ring 48 may be made of metal or of a polymer, with or without fiber reinforcement. In the embodiment shown, nylon with Kevlar fibers has been found to be a particularly suitable material for alignment ring 48, although other materials could also be used.

As illustrated in FIG. 5, alignment ring 48 is split, forming ends 60 and 62, to provide an opening along the circumference of alignment ring 48 for facilitating installation of alignment ring 48 over split outer ring 40. Alignment ring 48 includes locking means 64 for locking ends 60 and 62 together after installation of alignment ring 48 over split outer ring 40. Locking means 64 may comprise radially extending tab 66 on end 60 received within aperture 68 on end 62, or may comprise other configurations with similar effect.

When ends 60 and 62 are locked together, the hoop stress of alignment ring 48 serves to hold split outer ring 40 tightly together and provides positive alignment of arcuate portions 50 and 52 during and after installation of the split outer ring in a split housing. In addition, the hoop stress maintains the wedging action of the alignment ring 48 in circumferential groove 42, as previously described.

Figure 6:
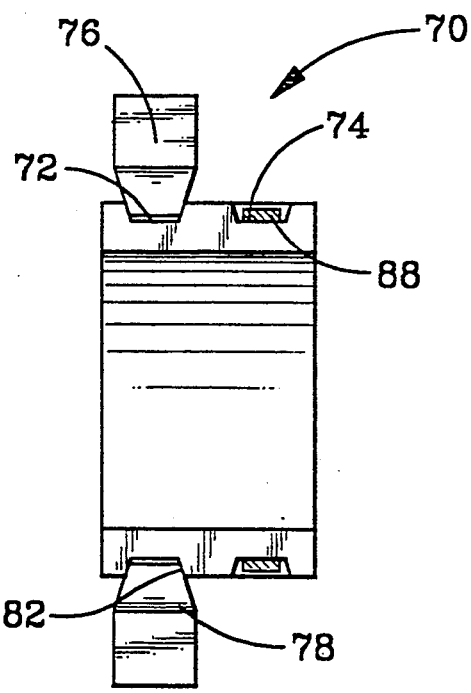
FIG. 6 is cross-sectional view of a second embodiment of split outer ring and alignment ring of the present invention, showing portions of an alignment fixture.
Figure 7:
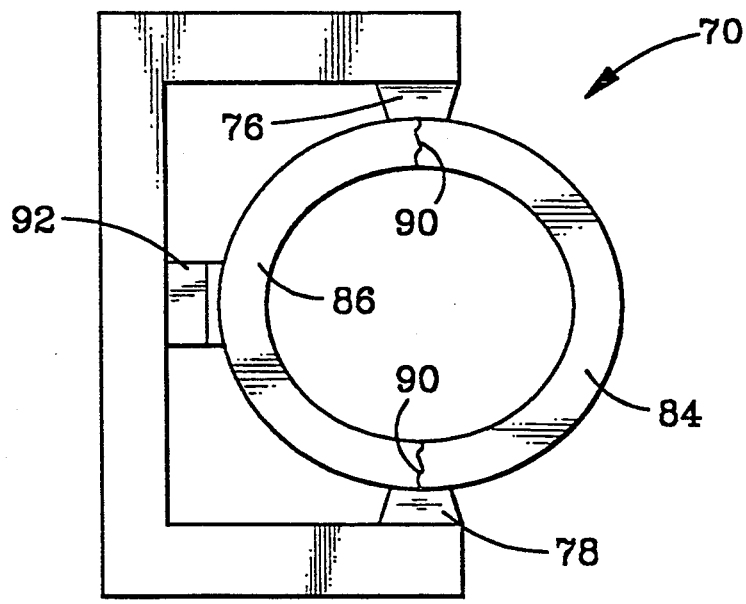
FIG. 7 is an end view of the split outer ring and alignment ring of FIG. 6, showing additional portions of the alignment fixture.

FIGS. 6 and 7 illustrate a method of assembly for a second embodiment of the present invention. Split outer ring 70 has first and second circumferential grooves 72 and 74. Opposing jaws 76 and 78 of alignment fixture 80 have tapered side surfaces that are positioned in first circumferential groove 72, in engagement with tapered side walls 82, to provide positive alignment of first arcuate portion 84 of split outer ring 70 with respect to second arcuate portion 86.

After alignment of split outer ring 70 by alignment fixture 80, alignment ring 88 is installed in second circumferential groove 74. Opposing jaws 76 and 78 of alignment fixture 80 are then released from first circumferential groove 72 such that split outer ring 70 is held together by alignment ring 88 as a rigid subassembly, maintaining the positive alignment of first and second arcuate portions 84 and 86, for insertion in a bearing housing.

Preferably, opposing jaws 76 and 78 are placed over split or fracture 90 separating first and second arcuate portions 84 and 86, as illustrated in FIG. 7. Alignment block 92 of alignment fixture 80 may be provided to facilitate such positioning of split ring 70. Alignment fixture 80 squeezes split outer ring 70 between opposing jaws 76 and 78 such that first and second arcuate portions 84 and 86 are elastically deformed, overcoming any deformation of split outer ring 70 that may have occurred during the fracturing process.

To facilitate alignment of fracture 90 by alignment fixture 80, first and second arcuate portions 84 and 86 are held only loosely together during the step of elastically deforming split outer ring 70, prior to installation of alignment ring 88. Preferably, the fracture zones of split outer ring 70 are brought into positive engagement with a steadily increasing force as the ultimate clamping force of alignment ring 88 is applied.

Alignment ring 88 may have tapered side surfaces, similar to side surfaces 56 of alignment ring 48 of the first embodiment, to mate with and engage tapered side walls of second circumferential groove 74, or may be a simple safety wire, flat metal strap, hose clamp, or other similar clamping means. For example, low profile Oetiker stepless ear clamps, available from Lapeer Manufacturing Company of Lapeer, Michigan, have been found to be suitable for use as alignment ring 88.

Although FIGS. 3 through 7 show split outer ring 40 or 70 and alignment ring 48 or 88 without other elements, for simplicity, it is to be understood that the split outer ring is assembled over a journal and rolling elements, to form a subassembly. For example, the split outer ring and alignment ring of the present invention may be used with split cage 28, rolling elements 30, and crankshaft journal 32 to form a subassembly that is installed within a housing comprising housing base 12 and cover 34.

A particular advantage of the present invention is enhanced operation and longevity due to the reduced chance of a step or mismatch in the raceway formed on the inside of the split outer ring. Applicants have found that the split outer ring described herein results in quieter operation of the housed bearing and in less likelihood of fatigue problems related to a step or mismatch of the raceway.

The preferred embodiment has been illustrated herein with respect to its application in the main bearing locations of two-cycle and four-cycle engines. However, it should be understood that the split outer ring and method of assembly of the present invention are also applicable to other uses of housed bearings with split rings.

Having described the invention, what is claimed is:

1. A split outer ring and alignment ring for mounting in a bearing housing, the combination comprising:
   a split outer ring having a raceway provided on a radially inwardly directed surface and a circumferential groove with tapered side walls provided on a radially outwardly directed surface, the split outer ring comprising a first arcuate portion and a second arcuate portion; and an alignment ring engaging the circumferential groove of the split outer ring, forming an interference fit with the tapered side walls of the circumferential groove such that alignment of the first arcuate portion with respect to the second arcuate portion is maintained.

2. The split outer ring and alignment ring combination according to claim 1, wherein the tapered side walls of the circumferential groove each have a draft angle of between 3 degrees and 10 degrees.

3. The split outer ring and alignment ring combination according to claim 1, wherein the alignment ring has angled side surfaces that form a wedge shape to mate with the tapered side walls of the circumferential groove of the split outer ring.

4. The split outer ring and alignment ring combination according to claim 1, wherein the alignment ring extends radially outward of the split outer ring for providing an interference fit with a bearing housing.

5. The split outer ring and alignment ring combination according to claim 1, wherein the alignment ring is formed of a polymer and includes fibers.

6. The split outer ring and alignment ring combination according to claim 1, wherein the alignment ring is formed of metal.

7. The split outer ring and alignment ring combination according to claim 1, wherein the alignment ring is split, forming two ends providing an opening point along the circumference of the alignment ring, for facilitating installation of the alignment ring over the split outer ring.

8. The split outer ring and alignment ring combination according to claim 7, wherein the alignment ring includes locking means for locking the two ends of the alignment ring together after installation of the alignment ring over the split outer ring.

9. The split outer ring and alignment ring combination according to claim 8, wherein the locking means includes a radially extending tab on one end of the alignment ring received within an aperture provided in the other end of the alignment ring.

* * * * *